UNITED STATES PATENT OFFICE.

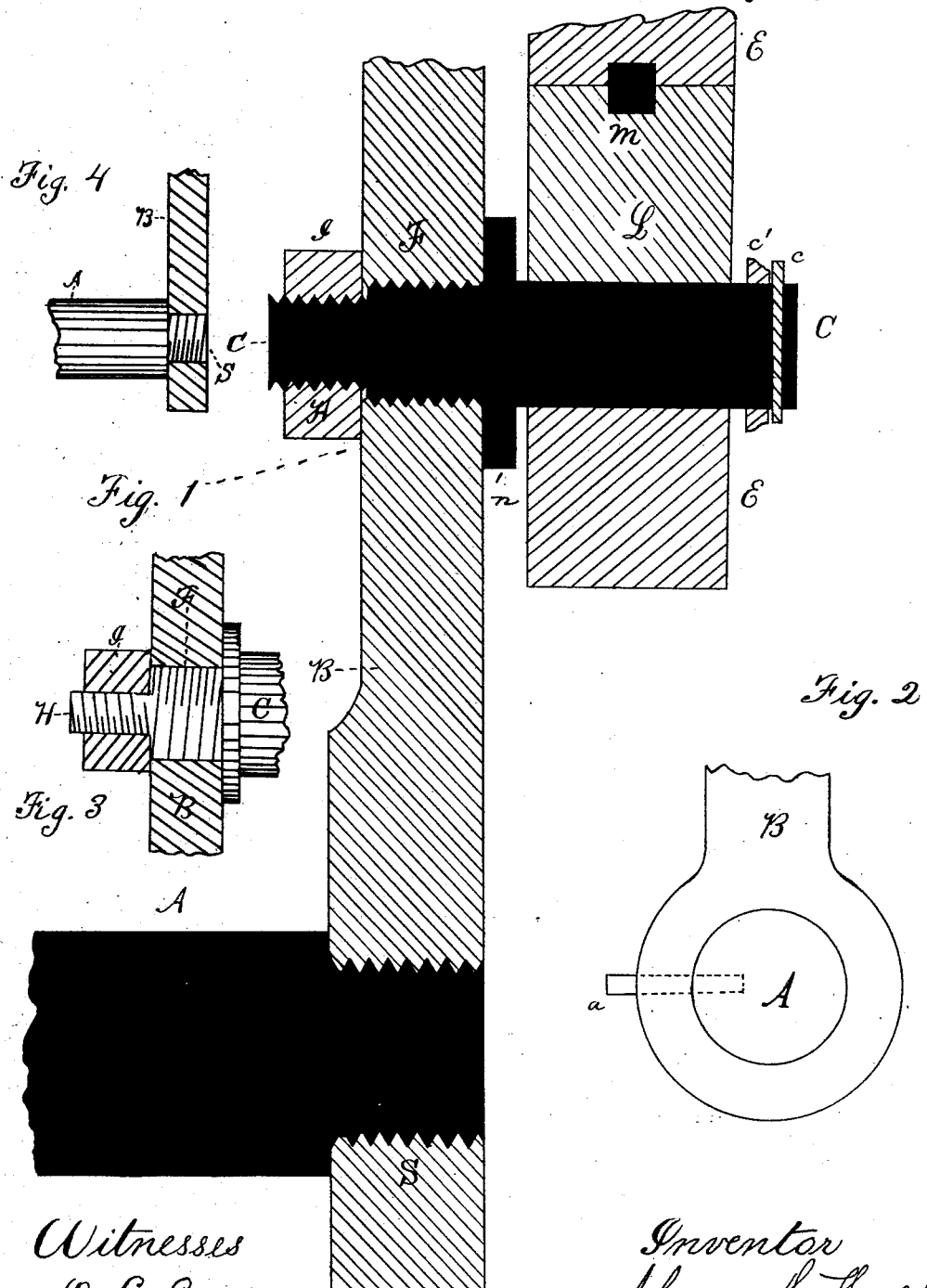

ABRAM W. WOLF, OF BRADFORD, PENNSYLVANIA.

CRANK OR WRIST PIN.

SPECIFICATION forming part of Letters Patent No. 244,780, dated July 26, 1881.

Application filed May 27, 1881. (No model.)

*To all whom it may concern:*

Be it known that I, ABRAM W. WOLF, of Bradford, McKean county, Pennsylvania, have invented new and useful Improvements in Crank or Wrist Pins; and I do hereby declare that the following is a full, clear, and exact description thereof, reference being had to the accompanying drawings and the letters or figures of reference marked thereon.

The common method of attaching crank or wrist pins to the crank is as follows: The pin is driven through the eye of the crank until the outer face of the latter is jammed against the collar formed upon or with the pin. To prevent the pin from coming loose a nut is screwed upon the screw-threaded extension of the pin which passed through the crank until the latter is tightly clamped between said collar and nut. The end of the pin opposite to the nut is journaled in the eye of a pitman, and is prevented from slipping off by a collar and pin, which can be easily removed whenever it becomes necessary to take the pitman off the pin. To prevent the pin from having free play in the eye and jarring the machinery, a follower is inserted in the eye, and is held in place by a key that forces the follower down upon the pin which rests in the bottom of the eye. Whenever the follower becomes keyed too tight—a common occurrence—the oscillating pitman tends to turn the pin in the crank, the result being that the nut, which is screwed tight against the crank, is gradually worked off and the pin becomes disconnected from the crank. Such an accident sometimes works an almost irreparable injury to the walking-beams and the tools suspended therefrom.

The object of my invention is to avoid these accidents; and to this end it consists of new and novel means, which will hereinafter be described, whereby the desired result is attained.

Figure 1 represents a sectional view of a crank, pitman, and pin, and Fig. 2 an end view of the crank and shaft, showing the manner of giving additional strength to the screw-joint between the shaft and crank; Fig. 3, a detail view, showing the crank in section and the right and left screws upon the pin in elevation; and Fig. 4, a detail view, showing the crank in section and the pin in elevation.

A represents the shaft of the hand-wheel; B, the crank; C C, the pin; E, the pitman, and L the follower in the eye of the pitman.

The pin C is provided with a collar, n, the inner face of which rests against the outer face of the crank B. The extension of pin C is provided with two screw-threaded pins, F and H. Pin F is a left-handed screw, and is screwed into the crank C. The pin H is a right-handed screw, and is provided with a jam-nut, which is screwed tight against the crank. The end opposite the nut I is journaled in the eye-pitman E, which is held in place by a removable collar, c', and pin C, so that the pitman can be detached whenever necessary. A follower, L, is inserted into the eye, and is forced down upon pin C by a key, m, inserted between the upper end of the follower and pitman.

The crank B is provided near its lower end with a screw-threaded eye, into which the pin S upon shaft A is screwed. The pin S is preferably threaded to turn in the direction opposite to that in which it is designed that the crank shall turn, so that the tendency of the crank will be to screw itself tighter upon the shaft. To prevent the crank from unscrewing when it is turned in an opposite direction a pin, a, is inserted partly in or wholly through the shaft-pin S and the crank.

The operation is as follows: Ordinarily the crank moves forward by reason of the power received from the revolving shaft A of the band-wheel. If the follower upon the pitman be too tight, as is often the case, it will turn the pin in the direction opposite to that in which the pitman is moving. It is here that the left-handed pin shows its usefulness, as the more the follower turns the pin the tighter the latter will be screwed into crank B. If the motion be reversed, the pin F would become unscrewed if it were not for the right-handed screw H and jam-nut I, which will clamp crank B against the collar if the pin F should unscrew ever so little.

What I claim as new is—

1. A pin having a right and left screw, a collar, and a nut upon one end for the purpose set forth, in combination with a crank and a pitman, substantially in the manner described.

2. A pin having a right and left screw, a collar, and a nut upon one end, for the purpose set forth, in combination with a crank attached to the shaft in the manner described, and a pitman, substantially as set forth.

3. A pin C, having right and left screws F and H, collar *n*, and nut I, in combination with a crank, B, and a pitman, E, substantially as set forth.

4. A pin, C, having right and left screws F and H, collar *n*, and nut I, in combination with a crank, B, attached to pin S upon shaft A, in the manner shown, and a pitman, E, substantially as set forth.

In testimony that I claim the foregoing I have hereunto set my hand this 21st day of May, 1881.

A. W. WOLF.

Witnesses:
 R. G. CURREN,
 GEO. A. STURGEON.